United States Patent [19]

Hart

[11] 4,406,083
[45] Sep. 27, 1983

[54] CRAB CATCHER

[76] Inventor: Walter R. Hart, 33 Fifth Ave., Port Washington, N.Y. 11050

[21] Appl. No.: 316,669

[22] Filed: Oct. 30, 1981

[51] Int. Cl.³ .............................................. A01K 69/10
[52] U.S. Cl. ...................................................... 43/105
[58] Field of Search ..................... 43/63, 100, 102, 105

[56] References Cited

U.S. PATENT DOCUMENTS

| | | | |
|---|---|---|---|
| 1,403,171 | 1/1922 | Koenig | 43/105 |
| 2,652,656 | 9/1953 | Glasser | 43/105 |
| 2,728,164 | 12/1955 | Mears | 43/105 |

Primary Examiner—Nicholas P. Godici
Assistant Examiner—Peter Martine
Attorney, Agent, or Firm—Robert E. Burns; Emmanuel J. Lobato; Bruce L. Adams

[57] ABSTRACT

A crab catcher comprises a net attached to the lower ends of four arms which are pivoted near their upper ends on a ring having a cross-bar. A second ring engages upper ends of the arms in set condition to hold them in and thereby spread the lower ends of the arms out to spread the net. A vertical bait bar is pivoted on the cross-bar of the first ring and has a barbed lower end to hold the bait. The upper end of the bait bar has an eye which is releasably hooked onto a weighted hook on a line which is attached with slack to the bait bar and also to the second ring. A float ring has a central opening receiving upper ends of the arms. A tiltable washer on the bait bar is engageable with points projecting into the central opening of the float ring to retain the float ring until the bait bar is moved in any direction, whereupon the float ring is released and rises to the water surface. An upward pull on the line pulls the second ring off of the upper ends of the arms, whereupon lower ends of the arms swing in to form the net into a bag capturing any crab in the net.

9 Claims, 10 Drawing Figures

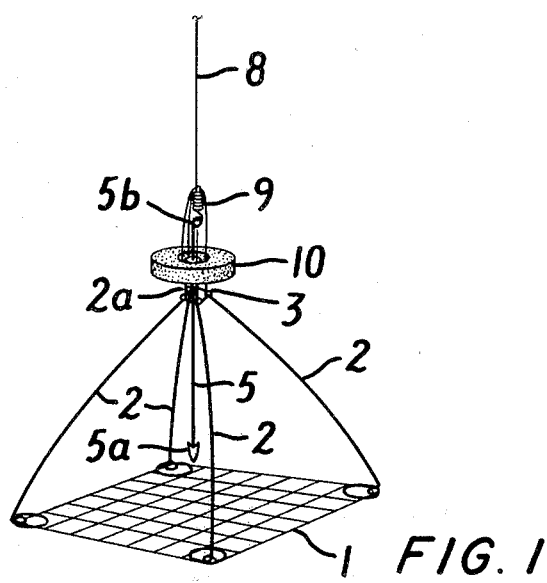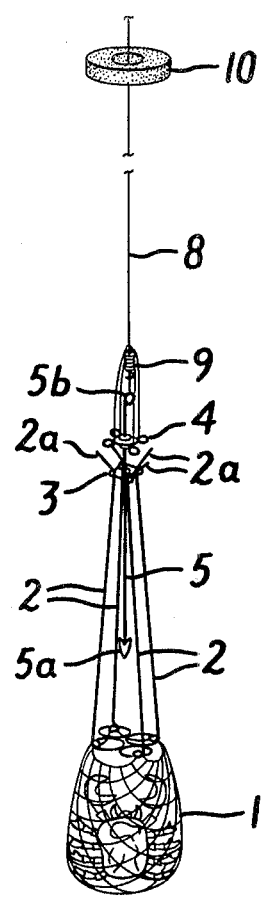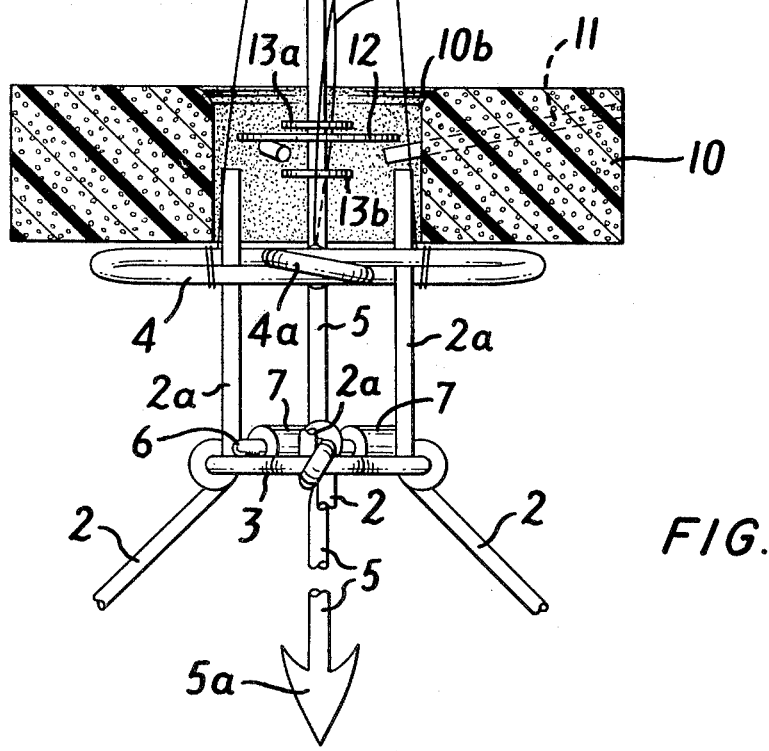
FIG. 1
FIG. 2
FIG. 3

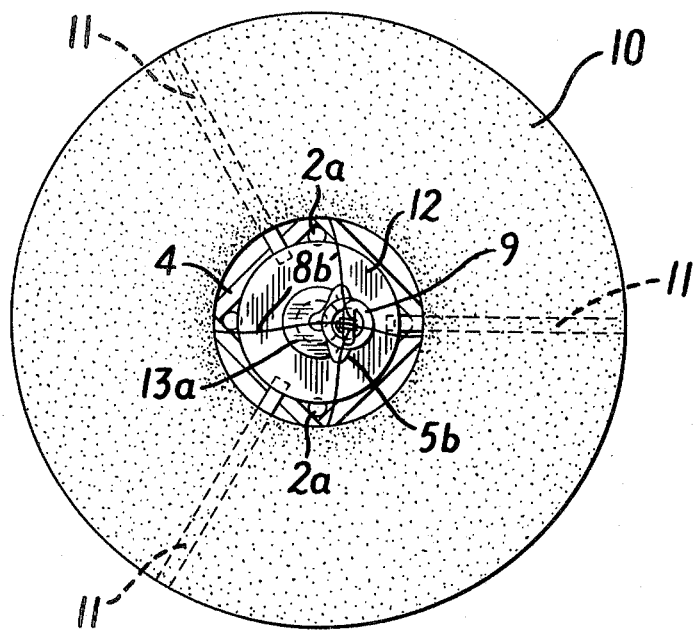
FIG. 4
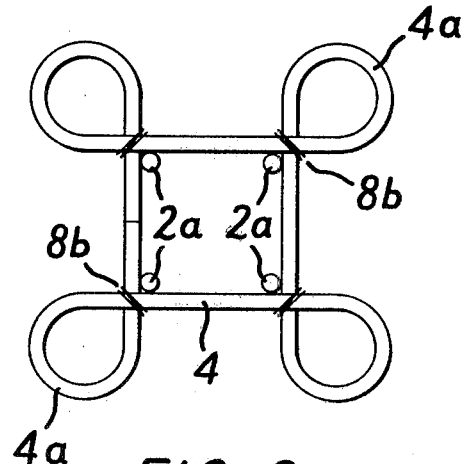
FIG. 7
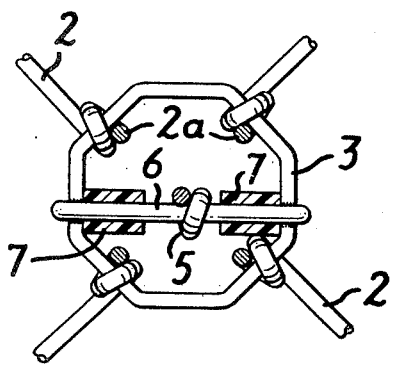
FIG. 5
FIG. 6
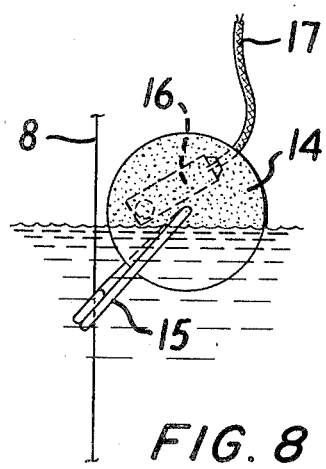
FIG. 8
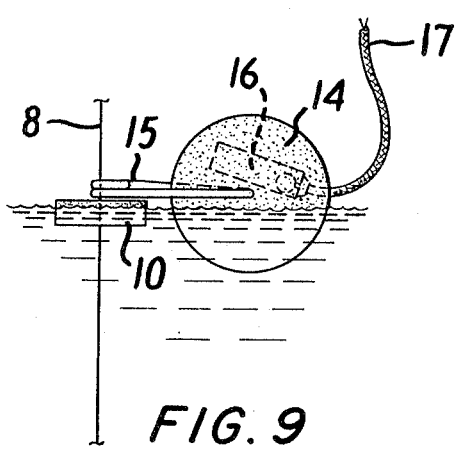
FIG. 9
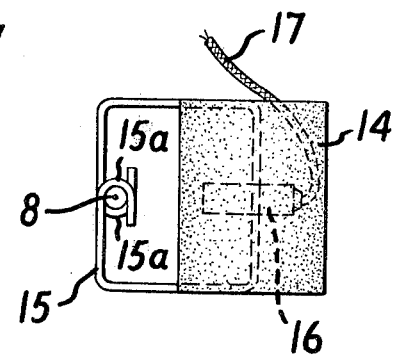
FIG. 10

CRAB CATCHER

BACKGROUND OF THE INVENTION

Various devices have heretofore been proposed for catching crabs. For example Koenig U.S. Pat. No. 1,403,171 discloses a crab trap having a net attached to a frame something like that of an umbrella. The frame comprises a central stem to the end of which six ribs are pivotally attached. Stretchers are connected at one end to the respective ribs and at the other end to a runner which is slidable on the stem. When the device is lowered to the bottom it opens up by gravity so that the net is spread on the bottom. When the trap is raised by a line attached to the runner, the ribs are folded up so that the net forms a pocket.

Glasser Pat. No. 2,652,656 discloses a trap having four flexible ribs emanating from a cross-shaped spider provided on the upper portion of a central shaft. A set of rods are pivotally connected at one end to brackets secured to intermediate portions of the ribs and at the other end to a further spider which is slidable on the central shaft but has a spring detent for holding it in set position. A square net is attached at its corners to the lower ends of the ribs. The trap is closed by a sharp jerk upwardly on a line attached to the central shaft.

Mears U.S. Pat. No. 2,728,164 discloses a crab trap comprising a plurality of legs which slope inwardly from a ring to which a sheet of wire mesh is secured. A collapsible net secured to the ring is adapted to be moved between a position lying on the surface upon which the trap is placed to a position lying against the legs to form a pocket which is, however, open at the top.

SUMMARY OF THE INVENTION

It is an object of the present invention to provide a crab catcher which is relatively simple in comparison with the devices heretofore available but is highly effective in catching crabs.

In accordance with the invention, the crab catcher comprises a plurality of arms pivotally connected with a ring. Upper ends of the arms extend above the ring while longer lower ends extend down from the ring. Flexible mesh material such as large mesh netting is secured at its periphery to the lower ends of the arms. A second ring disposed above the first ring is engageable with upper ends of the arms to retain the upper ends inwardly and thereby spread lower ends of the arms outwardly to spread the mesh material. A bait holder pivoted on a cross-bar of the first-mentioned ring has its lower end barbed so as to hold bait somewhat above the mesh material and is provided at its upper end with an eye to which a line is attached. The line is also attached to the second ring and there is enough slack in the connection to the bait holder that when the line is pulled up it first disengages the second ring from the upper ends of the arms and then lifts the entire crab catcher by means of the connection to the bait holder. When the crab catcher is thus lifted, the net forms a closed pocket so as to prevent the escape of any crab that has been caught.

In accordance with the invention there is also provided means for signalling that a crab is in position to be caught. Such signal means may for example be in the form of a float ring which is released by movement of the bait holder in any direction so as to come up the line to the surface of the water and thereby provide a signal that the bait has been attacked.

A further feature of the invention is that feet provided at the lower ends of the arms serve the dual purpose of preventing the crab catcher from sinking into a soft bottom surface and also providing a closure for the top of the bag formed by the mesh material in closed condition.

BRIEF DESCRIPTION OF DRAWINGS

The nature, objects and advantages of the invention will be more fully understood from the following description of a preferred embodiment shown by way of example in the accompanying drawings in which:

FIG. 1 is a small scale schematic perspective view showing the crab catcher in open condition;

FIG. 2 is a small scale schematic perspective view showing the crab catcher in closed condition;

FIG. 3 is a side view partially in section showing a portion of the crab catcher;

FIG. 4 is a plan view of the portion shown in FIG. 3;

FIG. 5 is a plan view showing a ring to which the arms and bait holder are pivotally connected together with adjacent portions of the arms and bait holder;

FIG. 6 is a plan view of the second ring engageable with upper portions of the arms in set condition of the crab catcher;

FIG. 7 is a plan view showing feet on the lower ends of the arms;

FIGS. 8 and 9 are end elevations of a signalling device at the surface of the water, and FIG. 10 is a plan view of the device as shown in FIG. 9.

DESCRIPTION OF PREFERRED EMBODIMENT

A preferred embodiment of the crab catcher in accordance with the present invention as illustrated by way of example in the drawings comprises mesh material 1 attached at its periphery to the lower ends of arms 2. The mesh material 1 may for example be flexible netting which preferably has a mesh size of about 1½ to 2 inches so that the legs of a crab may protrude through the netting. As illustrated in the drawings, there are four arms 2 and the mesh material 1 is approximately square with its corners attached to the lower ends of the arms.

The arms 2 are preferably formed of wire which is sufficiently strong to retain its form while being somewhat resilient so that it can be slightly bent and will spring back to its original shape. At a distance about 1/10 of length from their upper ends, the arms 2 are pivotally connected with a ring 3 which is likewise conveniently formed of heavy wire. The pivotal connection of the arms 2 to the ring 3 is conveniently effected by making one turn of the arm-forming wire around the wire of the ring 3. In assembling the crab catcher, the wire forming the arms 2 is advantageously wrapped around a wire which is to form the ring 3 while the latter wire is still straight. The wire for the ring 3 is then bent into ring shape and opposite ends joined, for example by welding. Upper end portions 2a of the arms 2 are disposed at an angle to lower portions of the arms so as to be substantially vertical as shown in FIG. 3 while lower portions of the arms slope out to the corners of the mesh material 1.

At their lower ends the arms 2 are provided with "feet" which serve the three-fold purpose of providing for convenient attachment of the mesh material, preventing lower ends of the arms from sinking into a soft or muddy bottom and forming a closure for the upper end of a bag formed by the mesh material when in the condition illustrated in FIG. 2. The feet are conveniently formed by bending the wire first in a small loop 2b for attachment of the mesh material and then in a larger loop 2c (FIG. 7) which together with the smaller loop 2b prevents the arms from sinking into a soft bottom and also provides a closure for the bag-like structure formed by the mesh material when in the condition illustrated in FIG. 2. There are at least three arms 2 and preferably not more than six.

In set condition of the crab catcher, upper ends 2a of the arms 2 are engaged in a second ring 4 which holds upper end portions of the arms inwardly and thereby forces lower portions of the arms outwardly so as to stretch the mesh material 1 between them as seen in FIG. 1. The angle at which the upper portions 2a of the arms are disposed is selected so that when the upper portions of the arms are held in by the ring 4, the arms are resiliently bowed slightly as seen in FIG. 1. As illustrated in FIG. 6, the ring 4 is square with outwardly projecting loops 4a formed at its corners for a purpose that will be described below. As in the case of the ring 3, the ring 4 is conveniently formed by bending wire to the desired shape.

A vertically extending trigger bar 5 is pivotally mounted on a cross-bar 6 which extends across and is secured to the ring 3 for example by welding. The trigger bar 5 extends downwardly toward the mesh material 1 in set condition of the crab catcher as illustrated in FIG. 1 and is provided with a barb 5a for retention of bait. The trigger bar extends upwardly beyond the ring 4 and is provided at its upper end with a loop or eye 5b which is shown in FIG. 3 as being slightly bent but which can, if desired, be straight. The trigger bar 5 is conveniently formed of wire and the pivotal connection of the trigger bar to the cross-bar 5 is conveniently provided by making one turn of the trigger bar around the cross-bar as illustrated in FIG. 5. The pivotal connection is such as to provide in effect a universal joint so that the lower end of the bait bar which holds the bait can be moved in any direction from its normal centered position. Means is preferably provided for keeping the bait bar approximately centered on the cross bar 6. The centering means is illustrated schematically in FIG. 5 as comprising two small sleeves 7 which may, for example, be formed of plastic or wound of wire.

The crab catcher is lowered to the bottom of a body of water by means of a line 8 which may, for example, be of the kind used for a fishing line. The line 8 is attached to a weight 9 which is illustrated as being a short coil of wire having an eye 9a at its upper end and a hook 9b at its lower end. The line 8 is attached to the eye 9a of the weight 9 and an end portion 8a of the line—or a short piece of line—extends down through the coil 9 and is secured to the eye 5b of the bait bar 5 with approximately one inch of slack as illustrated in FIG. 3. Two—or preferably four—short pieces of line 9b extend down from the eye 9a of the coil 9 and are secured to the upper ring 4, preferably at the crossover junctions of the loops 4a as illustrated in FIG. 6.

With the crab catcher in set position as illustrated in FIG. 1 and with the hook 9b of the coil 9 engaged in the eye 5b of the bait bar 5, the bait catcher is lowered to the bottom of a body of water by means of the line 8. When the crab catcher reaches and is supported by the bottom, the hook 9b of the coil 9 disengages from the eye 5b of the bait rod 5 by reason of the weight of the coil 9. The hook 9b is of such shape as to disengage itself easily from the bait bar. When the hook 9b of the weight 9 is thus disengaged, the line 8 is connected with the bait bar by the line extension 8a and is connected to the upper ring 4 by the lines 8b. The length of the line 8a and the lines 8b are selected such that an upward pull on the line 8 first pulls the ring 4 off of the upper portions 2a of the arms 2—thereby releasing the arms—and then raises the arms 2 and mesh material 1 by means of the bait bar 5. When the arms 2 are released from the ring 4, they swing inwardly so as to form the mesh material into a bag-like shape as shown in FIG. 2 so as to retain any crab that may have been on the net. As described above, the feet portions 2b, 2c of the arms 2 form a top closure for such bag.

Means is provided for signalling that a crab has entered the crab catcher and has attacked the bait on the lower barbed end of the bait bar 5. Such means is illustrated by way of example as comprising a float ring 10 formed of bouyant material such as cork or styrofoam. The float 10 has a central opening 10a of a size to receive upper end portions 2a of the arms 2 when the latter are retained by the ring 4 as illustrated in FIG. 3. When the crab catcher is out of the water, the float ring 10 is supported by the loops 4a provided on the ring 4. Three equally spaced pins 11, which may conveniently be formed of wire, extend a short distance into the central opening 8a in position to engage under a washer 12 on the bait bar 5. The washer 12 fits loosely on the bait bar 5 so that it can tilt in any direction and is retained in a vertical direction between two small washers 13a and 13b which are fixed to the bait bar, for example by staking, welding or braising. When the crab catcher is submerged in set condition, the float ring 10 is prevented from rising by engagement of inner ends of the pins 11 under the periphery of the washer 12 which in turn is retained by the fixed washer 13a. If the bait bar 5 is pivoted in any direction, for example by a crab attacking the bait on the lower end of the bait bar, the washer 12 is disengaged from one or another of the pins 11 and thereupon tilts on the bait bar so as to release the other pins, thereby permitting the float ring to rise up along the line 8. The upper edge of the central opening 10a of the float ring is preferably sloped or rounded as indicated at 10b so as to prevent the float ring from becoming fouled on the weight 9. When the washer 12 has been released from the pins 11, its downward movement on the bait bar 5 is limited by the lower fixed washer 13b.

The crab catcher in accordance with the present invention can be used from a boat or from a warf, dock or bridge which extends over a body of water. In preparation for being lowered into the water, the crab catcher is put in set condition with the ring 4 engaging upper ends 2a of the arms 2, the float ring 10 resting on the protruding loops of the ring 4 and the eye 5b of the bait bar 5 engaged in the hook 9b of the weight coil 9. Moreover, bait is secured on the lower barbed end of the bait bar. The crab catcher in this condition is lowered into the water until it rests on the bottom. The hook of the weight 9 thereupon disengages from the eye 5b of the bait bar 5. The bait catcher remains resting on the bottom. When a crab crawls onto the mesh material 1 and attacks the bait on the bait bar 5, the bait bar is tilted so as to release the float ring 10 as described above. The float ring thereupon rises to the surface along the line 8 thereby alerting the fisherman to the fact that there is a crab on the mesh material. The fisherman thereupon pulls upwardly on the line 8, thereby pulling the ring 4 off of the upper ends 2a of the arms 2 as described above whereupon the lower ends of the arms swing inwardly to form the mesh material into a bag-like configuration as illustrated in FIG. 2. The feet 2b, 2c on the lower ends of the arms 2 form a closure for the top of the bag thus formed. As the fisherman continues to haul upwardly, the crab catcher with the crab confined therein is brought to the surface.

The line to the surface can be handled by hand, with short rod and reel or with a special davit. Such davit would be a rod of a diameter to fit the gudgeon provided for an oarlock. It would be bent to give a foot clearance from the boat. A stub shaft welded to the side of the davit would carry a narrow 8 inch reel provided with a handle for winding in the line. When the catcher has been raised to the surface it is swung inboard for removal of the crab and for resetting In FIGS. 8 to 10 there is shown a device for providing an audible and/or visual signal when the float ring 10 is released and rises to the surface of the water. The device is shown by way of example as comprising a cylindrical float 14 which may for example be hollow or may be formed of flotation material such a styrofoam. An arm 15 projecting radially from the float is shown as comprising a stiff wire which extends axially through the float and is bent into square or rectangular shape as seen in FIG. 10. Ends of the wire are bent to form U-shaped hooks 15a which overlap one another as seen in FIG. 10 so as to form a ring through which the line 8 passes. The line 8 may be inserted in the ring by slipping it between the two hook portions 15a. The arm 15 is fixed with respect to the cylindrical float 14, for example by gripping or being received in grooves in the ends of the float.

By reason of the weight of the arm 15, the float will normally assume approximately the position shown in FIG. 8 with the arm 15 extending downwardly at an angle of about 45°. When the float 10 rises to the surface along the line 8, it lifts the arm 15 so that the arm is approximately horizontal as seen in FIG. 9. Thus the float 10 rotates the cylindrical float 14 approximately 45°.

A mercury switch 16 is mounted in the cylindrical float 14 in such position that it is approximately level at the halfway point in the movement of the cylindrical float. The switch comprises in known manner a small quantity of mercury in a glass tube provided with contacts at one end. In the position shown in FIG. 8 the mercury is at the end of the tube opposite the contacts and hence the switch is "open." When the cylindrical float 14 is rotated to the position shown in FIG. 9, the mercury in the tube of the switch 16 runs to the end of the tube in which the electrical contacts are located thereby closing the switch. Thus the switch 16 is closed when the float 10 comes to the surface of the water along the line 8.

The switch 16 controls an appropriate audible or visual signal. Thus, for example, a battery and a bell or buzzer can be mounted in the float itself or in a nearby canister. Alternatively insulated wires may run from the switch to a ship or boat in which a battery and a signalling device, for example a buzzer, bell or light, are provided.

It will be evident that the signalling device illustrated in FIGS. 8 to 10 can be used anywhere there is a line from a submerged point to the surface of the water. Thus, for example, divers could send messages to the surface by means of the float 10. Instead of being a solid ring, the float 10 may have a diagonal slit extending into the central hole so that the line 8 can be inserted through the slit.

While a preferred embodiment of the invention has been illustrated in the drawings and is herein particularly described, it will be understood that modifications may be made and hence that the invention is in no way limited to the illustrated embodiment.

What I claim is:

1. A crab catcher comprising a first ring having a cross-bar, at least three arms pivoted on said first ring with upper ends extending above said first ring and longer lower ends extending down from said first ring, mesh means secured at its periphery to the lower ends of said arms, a second ring disposed above said first ring and engageable with upper ends of said arms to retain said upper ends inwardly and thereby spread lower ends of said arms outwardly to spread said mesh means, bait holding means pivoted on said cross-bar of said first ring and extending downwardly therefrom to position bait above said mesh means, means for producing a signal upon movement of said bait holding means in any direction about its pivot by a crab on said mesh means, and means operable to pull said second ring off of said upper ends of said arms and to pull upwardly on said arms to draw said mesh means as a bag around said crab.

2. A crab catcher according to claim 1, in which portions extending inwardly at the lower ends of said arms form feet to support said arms on a soft surface and form a closure for said bag formed by said mesh means when said arms are released from said second ring and pulled upwardly.

3. A crab catcher according to claim 1, in which a line extending from said crab catcher to the water surface is attached to said second ring to pull said second ring off of upper ends of said arms.

4. A crab catcher according to claim 3, in which said bait holding means comprises a vertical rod pivotally mounted on said cross-bar of said first ring and having at its lower end means for retaining bait and having an upper end extending up through said second ring and attached to said line.

5. A crab catcher according to claim 4, in which means for attaching said line to said vertical rod comprises disconnectible coupling means and an extension of said line connected with slack to the upper end of said rod.

6. A crab catcher according to claim 4, in which said signal means comprises a float ring having a central opening receiving upper ends of said arms above said second ring and three equally spaced pins extending into said central opening, and means on said vertical rod engageable with said pins to retain said float against rising and disengageable from said pins upon movement of said rod in any direction to release said float to rise along said line to the water surface.

7. A crab catcher according to claim 6, in which said means on said vertical rod comprises a washer which is restrained against movement upwardly on said rod and is tiltable on said rod.

8. A crab catcher according to claim 7, in which said second ring has outward extensions for supporting said float ring when not submerged.

9. A crab catcher according to claim 1, in which a line extends from said crab catcher to the water surface, and in which said signal producing means comprises a float ring releasable to rise along said line, a cylindrical float floating on the water surface and having a radially extending arm with an opening through which said line passes, said arm being engageable by said float ring, upon said float ring rising to the water surface, to change the attitude of said cylindrical float in the water, and switch means mounted on said cylindrical float and actuatable by said change of attitude of said cylindrical float.

* * * * *